(12) United States Patent
Yamane

(10) Patent No.: US 8,724,175 B2
(45) Date of Patent: May 13, 2014

(54) HALFTONE CORRECTION DEVICE AND METHOD, AND IMAGE FORMING APPARATUS USING THE HALFTONE CORRECTION DEVICE AND METHOD

(75) Inventor: Jun Yamane, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 78 days.

(21) Appl. No.: 13/489,959

(22) Filed: Jun. 6, 2012

(65) Prior Publication Data

US 2012/0327480 A1 Dec. 27, 2012

(30) Foreign Application Priority Data

Jun. 23, 2011 (JP) ................................. 2011-139613

(51) Int. Cl.
*H04N 1/405* (2006.01)
(52) U.S. Cl.
USPC ......................... 358/3.23; 358/3.14; 358/3.06
(58) Field of Classification Search
USPC .......... 358/1.9, 2.1, 3.1, 3.06, 3.14, 3.16, 3.2, 358/3.23, 1.16, 465, 468
See application file for complete search history.

(56) References Cited

U.S. PATENT DOCUMENTS

| 4,495,522 | A | * | 1/1985 | Matsunawa et al. | 358/465 |
| 5,398,297 | A | * | 3/1995 | Clark et al. | 358/1.9 |
| 7,064,869 | B2 | * | 6/2006 | Spaulding et al. | 358/3.1 |
| 7,871,145 | B1 | * | 1/2011 | Enge | 347/19 |

FOREIGN PATENT DOCUMENTS

| JP | 8-286442 | 11/1996 |
| JP | 2007-124352 | 5/2007 |
| JP | 2008-244644 | 10/2008 |

OTHER PUBLICATIONS

U.S. Appl. No. 13/361,431, filed Jan. 30, 2012, Shuji Hirai, et al.

* cited by examiner

*Primary Examiner* — Thomas D Lee
*Assistant Examiner* — Stephen M Brinich
(74) *Attorney, Agent, or Firm* — Oblon, Spivak, McClelland, Maier & Neustadt, L.L.P.

(57) ABSTRACT

A halftone correction device for an image forming apparatus including an intermediate transfer belt and performing halftone processes includes: a correction unit that performs halftone correction for each of the halftone processes using correction tables corresponding to the halftone processes; a pattern generation unit that generates on the belt halftone patterns based on at least one of the halftone processes; a measurement unit that measures image densities of the generated halftone patterns; an estimation unit that estimates, from the image densities of the halftone patterns, image densities of halftone patterns corresponding to the other ones of the halftone processes, by applying a relational expression as an estimation equation to patches of the halftone patterns having an equal image area ratio; and a table generation unit that generates the correction tables using target values and the image densities of the halftone patterns of the halftone processes.

6 Claims, 3 Drawing Sheets

HALFTONE CORRECTION DEVICE AND METHOD, AND IMAGE FORMING APPARATUS USING THE HALFTONE CORRECTION DEVICE AND METHOD

CROSS-REFERENCE TO RELATED APPLICATION

This patent application is based on and claims priority pursuant to 35 U.S.C. §119 to Japanese Patent Application No. 2011-139613, filed on Jun. 23, 2011, in the Japan Patent Office, the entire disclosure of which is hereby incorporated by reference herein.

FIELD OF THE INVENTION

The present invention relates to a halftone correction device for use in an image forming apparatus, a halftone correction method, and an image forming apparatus using the halftone correction device and employing the halftone correction method.

BACKGROUND OF THE INVENTION

In the production printing (PP) market, there is a strong demand for stable imaging performance resulting in consistently high quality of the output images. However, particularly with image forming apparatuses, it is difficult to prevent a change in halftone characteristics of colors based on a change over time in printer engine characteristics, and accordingly it is important to correct the halftone characteristics with the proper timing. To address this issue of correcting output images, a halftone correction device is widely used, which prints a special pattern chart, measures the colors of the chart using a scanner installed in an image forming apparatus, and refers to a correction table. The existing halftone correction device, however, prompts a user to perform the printing and scanning processes. Thus, the measurement and correction of the colors may fail to take place in a timely manner.

In view of the above, a halftone correction method is disclosed in JP-2009-211641-A that draws patches for correction on an electrophotographic intermediate transfer belt, measures the colors of the patches using image density sensors originally provided for controlling the solid density, and corrects the halftone. The method performs the halftone correction in a timely manner, specifically after solid density control is executed based on color and tone correction process. The method, however, forms a relatively large number of patch patterns with each correction. A dithering process serving as a halftone process includes various techniques, such as dot screen, line screen for 2-bit data, line screen for 4-bit data, and hybrid thereof. Particularly when a plurality of halftone processes (i.e., dithering processes) are performed, the number of patch patterns is multiplied by the number of halftone correction processes. The increase in the number of patch patterns increases the halftone correction time and the amount of toner consumed in the halftone correction processes, and thus imposes a burden on a user.

In view of the above, JP-2008-244644-A discloses a technique in which, when a plurality of screen dot processes are performed, the density of an image formed by a screen dot pattern generated with a specific number of lines is measured, and a screen dot pattern having another number of lines and not subjected to the measurement is estimated using a predetermined function model, to thereby generate a correction table. This method, however, is applicable only to estimation between screen dot patterns, and cannot comprehensively handle a variety of halftone processing patterns including screen line patterns.

SUMMARY OF THE INVENTION

The present invention provides a novel halftone correction device. In one example, a novel halftone correction device is for use in an image forming apparatus that includes an intermediate transfer belt, and performs a plurality of halftone processes. The halftone correction device includes a halftone correction unit, a halftone pattern generation unit, an image density measurement unit, a tone density estimation unit, and a correction table generation unit. The halftone correction unit is configured to include a plurality of correction tables corresponding to the halftone processes, and perform halftone correction processing for each of the halftone processes using the correction tables. The halftone pattern generation unit is configured to generate, on the intermediate transfer belt, halftone patterns based on at least one of the halftone processes. The image density measurement unit is configured to measure image densities of the halftone patterns generated on the intermediate transfer belt. The tone density estimation unit is configured to estimate, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio. The correction table generation unit is configured to include correction target values, and generate the correction tables for the halftone processes using the correction target values and the image densities of the halftone patterns of the halftone processes.

The relational expression employed in the above-described halftone correction device may include a linear expression set for each image area ratio.

The present invention further provides a novel image forming apparatus. In one example, a novel image forming apparatus performs a plurality of halftone processes, and includes an image forming mechanism and a halftone correction device. The image forming mechanism includes an intermediate transfer belt, and forms an image on a recording medium via the intermediate transfer belt. The halftone correction device includes a halftone correction unit, a halftone pattern generation unit, an image density measurement unit, a tone density estimation unit, and a correction table generation unit. The halftone correction unit is configured to include a plurality of correction tables corresponding to the halftone processes, and perform halftone correction processing for each of the halftone processes using the correction tables. The halftone pattern generation unit is configured to generate, on the intermediate transfer belt, halftone patterns based on at least one of the halftone processes. The image density measurement unit is configured to measure image densities of the halftone patterns generated on the intermediate transfer belt. The tone density estimation unit is configured to estimate, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio. The correction table generation unit is configured to include correction target values, and generate the correction tables for the halftone processes using the correction target values and the image densities of the halftone patterns of the halftone processes.

The relational expression employed in the above-described image forming apparatus may include a linear expression set for each image area ratio.

The present invention further provides a novel halftone correction method. In one example, a novel halftone correction method is for use in an image forming apparatus that includes an intermediate transfer belt and performs a plurality of halftone processes. The halftone correction method includes performing halftone correction processing for each of the halftone processes using a plurality of correction tables corresponding to the halftone processes; generating, on the intermediate transfer belt, halftone patterns based on at least one of the halftone processes; measuring image densities of the halftone patterns generated on the intermediate transfer belt; estimating, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio; and generating the correction tables for the halftone processes using correction target values and the image densities of the halftone patterns of the halftone processes.

The estimating applies, as the relational expression, a linear expression set for each image area ratio.

BRIEF DESCRIPTION OF THE DRAWINGS

A more complete appreciation of the invention and many of the advantages thereof are obtained as the same becomes better understood by reference to the following detailed description when considered in connection with the accompanying drawings, wherein.

DETAILED DESCRIPTION OF THE INVENTION

Figure 1:
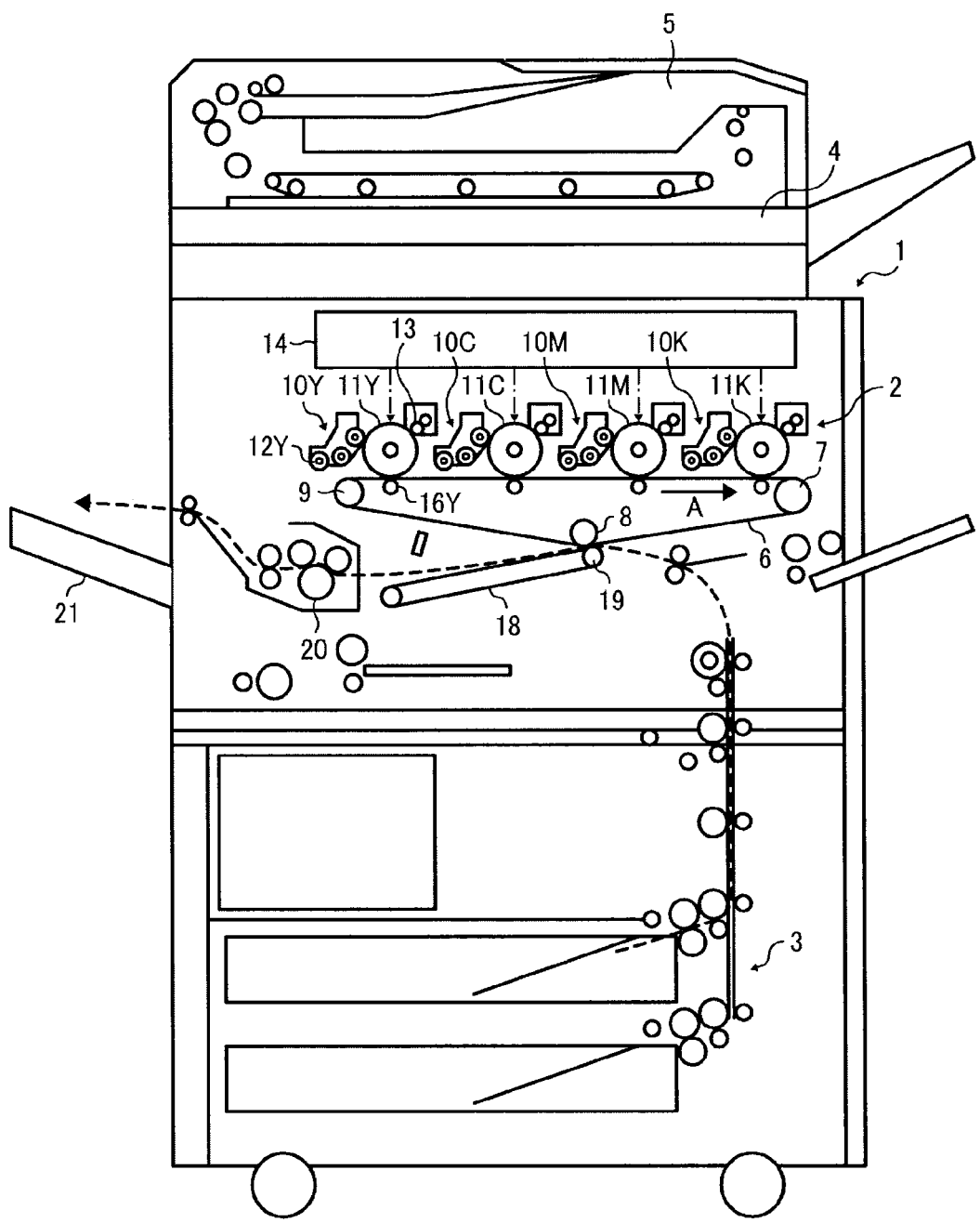
FIG. 1 is a schematic diagram illustrating an example of an image forming apparatus according to an embodiment of the present invention.

In describing the embodiments illustrated in the drawings, specific terminology is adopted for the purpose of clarity. However, the disclosure of the present invention is not intended to be limited to the specific terminology so used, and it is to be understood that substitutions for each specific element can include any technical equivalents that operate in a similar manner.

Figure 2:
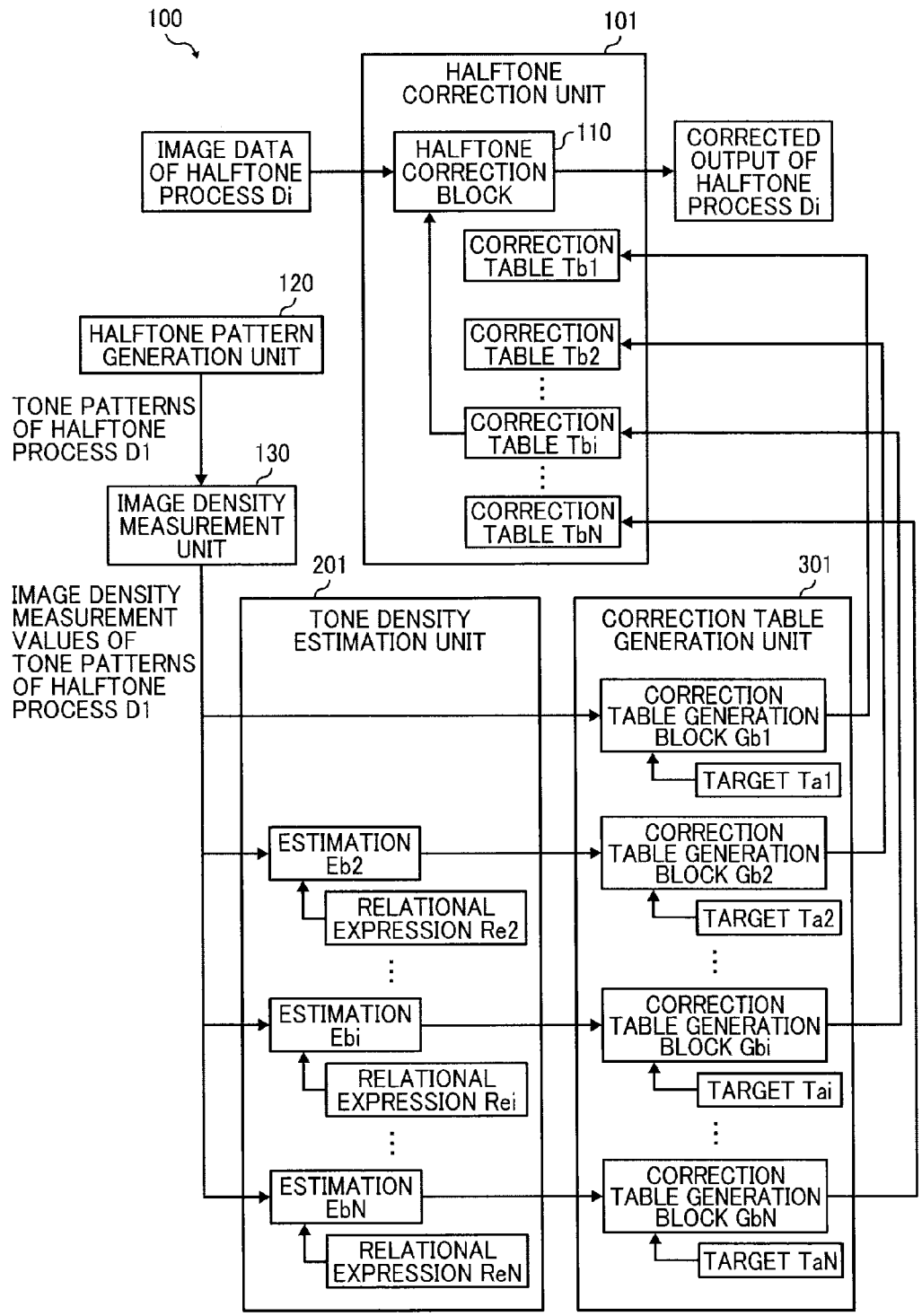
FIG. 2 is a block diagram illustrating a configuration of a halftone correction device of the image forming apparatus according to the embodiment.

Referring now to the drawings, wherein like reference numerals designate identical or corresponding parts throughout the several views, embodiments of the present invention will be described in detail. FIG. 1 is a schematic diagram illustrating an example of an image forming apparatus according to an embodiment of the present invention. FIG. 2 is a diagram illustrating a basic configuration of a halftone correction device of the image forming apparatus.

An image forming apparatus 1 illustrated in FIG. 1 includes an image forming unit 2 for forming an image on a recording sheet serving as a recording medium, a sheet feeding device 3 for supplying the recording sheet to the image forming unit 2, a scanner 4 for reading the image of a document, and an automatic document feeder 5 for automatically feeding a document to the scanner 4. A halftone correction device 100 according to an embodiment of the present invention is for use in an intermediate transfer-type image forming apparatus, such as the image forming apparatus 1 illustrated in FIG. 1, and may be implemented as software for an engine central processing unit (CPU) for controlling a not-illustrated image forming engine provided in the image forming apparatus 1. Further, the units illustrated in FIG. 2 may be replaced by corresponding method steps that form, as a whole, a halftone correction method.

The image forming unit 2 of the image forming apparatus 1 according to the embodiment of the present invention includes an endless intermediate transfer belt 6 wound around a drive roller 7, a secondary transfer backup roller 8, and a driven roller 9 and rotated in the direction indicated by an arrow A in FIG. 1 in accordance with the rotation of the drive roller 7. The intermediate transfer belt 6 is made of, for example, a material including a relatively non-stretchable polyimide resin dispersed with carbon powder for adjusting electrical resistance.

The image forming unit 2 further includes process cartridges 10Y, 10C, 10M, and 10K for yellow, cyan, magenta, and black colors disposed to face the intermediate transfer belt 6. The process cartridges 10Y, 10C, 10M, and 10K include image carrying members 11Y, 11C, 11M, and 11K, respectively, which are configured as drum-like photoconductors to carry toner images of different colors formed thereon. The toner images formed on the image carrying members 11Y, 11C, 11M, and 11K are transferred in a superimposed manner onto a recording medium fed by the intermediate transfer belt 6. The drum-like image carrying members 11Y, 11C, 11M, and 11K may be replaced by image carrying members each formed by an endless belt.

The configuration of forming the toner images on the image carrying members 11Y, 11C, 11M, and 11K of the process cartridges 10Y, 10C, 10M, and 10K and transferring the toner images onto the intermediate transfer belt 6 is substantially the same among the process cartridges 10Y, 10C, 10M, and 10K, except for the difference in color of the toner images. Therefore, the following description will be limited to the configuration of forming the toner image on the image carrying member 11Y of the process cartridge 10Y and transferring the toner image onto the intermediate transfer belt 6.

The image carrying member 11Y of the process cartridge 10Y is rotatably supported by a not-illustrated cartridge case, and is driven to rotate in the counterclockwise direction in FIG. 1 by a not-illustrated drive device. In this process, the image carrying member 11Y is applied with a charge voltage by a charging device formed by a charge roller 13 rotatably supported by the cartridge case and disposed to face the image carrying member 11Y. Thereby, the outer circumferential surface of the image carrying member 11Y is charged to a predetermined polarity. The charge roller 13 is a configuration example of a charging device that charges an image carrying member.

The charged image carrying member 11Y is applied with optically modulated laser light emitted from an optical writing unit 14 provided separately from the process cartridge 10Y. Thereby, an electrostatic latent image is formed on the image carrying member 11Y. The thus formed electrostatic latent image is visualized as a yellow toner image by a development device 12Y that includes the cartridge case.

On the opposite side of the process cartridge 10Y across the intermediate transfer belt 6, a primary transfer roller 16Y is disposed. With the primary transfer roller 16Y applied with a transfer voltage, the toner image on the image carrying member 11Y is primary-transferred onto the intermediate transfer belt 6 driven to rotate in the direction indicated by the arrow A. After the transfer of the toner image, residual toner adhering to the image carrying member 11Y is scraped off and removed by a not-illustrated cleaning device.

A cyan toner image, a magenta toner image, and a black toner image are formed on the image carrying members 11C, 11M, and 11K, respectively, and are sequentially primary-transferred in a superimposed manner onto the intermediate transfer belt 6, to which the yellow toner image has been transferred. Thereby, a composite toner image is formed on the intermediate transfer belt 6.

Meanwhile, a recording medium is fed from the sheet feeding device 3 disposed under the image forming unit 2. The recording medium fed by the sheet feeding device 3 is then fed, with predetermined timing, by a registration roller pair to the space between a portion of the intermediate transfer belt 6 wound around the secondary transfer backup roller 8 and a secondary transfer roller 19 disposed inside a transfer feed belt 18 to face the portion of the intermediate transfer belt 6. In this process, the secondary transfer roller 19 is applied with a predetermined transfer voltage, and thereby the composite toner image on the intermediate transfer belt 6 is secondary-transferred onto the recording medium.

The recording medium having the composite toner image secondary-transferred thereto is further fed upward and sent into a fixing device 20, and the toner image on the recording medium is fixed thereon with heat and pressure applied thereto. The recording medium then passes the fixing device 20, and is discharged to a sheet discharging unit 21 of the image forming apparatus 1. Further, post-transfer residual toner adhering to the intermediate transfer belt 6 after the transfer of the toner image is removed by a not-illustrated cleaning device.

The above-described image forming apparatus 1 includes a not-illustrated nonvolatile memory for storing a variety of information, such as outputs from sensors, correction control results, and the frequency of use of a pattern type in each print job.

FIG. 2 illustrates a configuration of a halftone correction device 100 according to an embodiment of the present invention, showing inclusion of a halftone correction unit 101, a halftone pattern generation unit 120, an image density measurement unit 130, a tone density estimation unit 201, and a correction table generation unit 301.

The halftone correction unit 101 includes a halftone correction block 110 and correction tables Tb1 to TbN corresponding to halftone processes D1 to DN. The tone density estimation unit 201 includes estimation blocks Eb2 to EbN for performing estimations corresponding to halftone processes D2 to DN and relational expressions Re2 to ReN serving as estimation equations corresponding to the estimation blocks Eb2 to EbN for performing estimations. The correction table generation unit 301 includes correction table generation blocks Gb1 to GbN for performing correction table generations corresponding to the halftone processes D1 to DN and targets Ta1 to TaN serving as target values for use in correction. The configuration of the halftone correction block 110, the halftone pattern generation unit 120, the image density measurement unit 130, and the correction table generation unit 301 employed in the present embodiment is similar to the configuration used in a known halftone correction device, such as the configuration of Japanese Patent Application No. 2009-211641, for example.

In a not-illustrated halftone processing unit of the present image forming apparatus 1, when image data described in a page description language is input as input data to the image forming apparatus 1 from a host computer, a rasterization unit forms a raster image. In this process, a type signal representing the type, such as text, line, photograph, or graphic image, for example, and an attribute signal are generated for each object, and the image data is subjected to processing by a modulation transfer function (MTF) filter and a color and tone correction processor, which are both well known in the art, and then is subjected to halftone processing to produce, halftone-processed image data. Thereafter, the halftone correction block 110 performs halftone correction processing on the image data to generate output image data as a corrected output of the halftone processing.

The halftone pattern generation unit 120 selects, in accordance with the attribute signal transmitted from the above-described rasterization unit, a dither matrix set to an optimum number of lines and an optimum screen angle. Thereby, an area coverage modulation pattern is selected as a halftone pattern.

The image density measurement unit 130 may employ a method using reflective optical sensors as a specific example of the method of measuring the image density. The image density measurement unit 130 may use, as reflective optical sensors for detecting toner adhesion amounts, a black toner adhesion amount detection sensor and a color toner adhesion amount detection sensor, which are both well known in the art. The black toner adhesion amount detection sensor is basically configured to include a light emitting element formed by a light emitting diode or the like and a light receiving element for receiving regularly reflected light. The light emitting element directs light onto the intermediate transfer belt 6. The applied light is reflected by the intermediate transfer belt 6. The light receiving element receives regularly reflected light of the reflected light. The color toner adhesion amount detection sensor is basically configured to include a light emitting element formed by a light emitting diode or the like, a light receiving element for receiving regularly reflected light, and a light receiving element for receiving diffusedly reflected light. The light receiving element for receiving diffusedly reflected light receives diffused reflected light of the reflected light. In the present embodiment, the toner adhesion amount detection sensors are provided near the intermediate transfer belt 6, and an image forming condition is determined on the basis of the toner adhesion amounts on the intermediate transfer belt 6. Alternatively, the toner adhesion amount detection sensors may be provided above the image carrying members 11Y, 11C, 11M, and 11K or above the transfer feed belt 18.

Sensors provided in an existing image forming apparatus to measure the image densities of solid density patterns drawn on the intermediate transfer belt 6 to correct the solid densities may be directly used as the toner adhesion amount detection sensors for halftone correction processing, or sensors the same in function as the sensors for the solid density correction but specialized for the halftone correction processing of the halftone correction device 100 may be separately provided.

The correction table generation unit 301 is configured to generate the correction tables Tb1 to TbN for correcting tone characteristics. The correction table generation unit 301 performs a control of forming on the intermediate transfer belt 6 tone patterns of the respective colors by sequentially changing a charge bias and a development bias with proper timing, causing the toner adhesion amount detection sensors to detect the toner adhesion amounts of the tone patterns of the respective colors, converting sensor output voltages into the toner adhesion amounts, and changing, on the basis of the detection results of the toner adhesion amounts, the development bias value and the toner density control target value to obtain the target toner adhesion amounts. In the control of correcting the tone characteristics, selected area coverage modulation patterns of, for example, ten tones for each of the colors are formed on the intermediate transfer belt 6 with the use of the selected pattern type. Then, the toner adhesion amount detection sensors detect the regularly reflected light and the diffusedly reflected light reflected by patches of the formed area coverage modulation patterns, and the detected output voltages of the patches are converted into the toner adhesion amounts to calculate the current tone characteristics. On the basis of the tone characteristics, correction signals for obtaining the target toner adhesion amounts are generated and fed back to respective correction units of a copier and a printer included in the image forming apparatus 1. Then, the tone characteristics are corrected, and the correction tables Tb1 to TbN are generated.

In the generation of the correction tables Tb1 to TbN, the correction tables Tb1 to TbN are generated with the use of the targets Ta1 to TaN of the halftone characteristics to be provided by the present image forming apparatus 1. For example, a correction table Tbi is generated with the use of a target Tai. The targets Ta1 to TaN of the halftone characteristics are determined at the design stage. In the generation of the correction tables Tb1 to TbN, initial correction tables are calculated and generated with the use of the targets Ta1 to TaN and the measurement results of the halftone characteristics subjected to no correction such that the halftone characteristics of output images match the targets Ta1 to TaN. The thus-generated correction tables Tb1 to TbN are set in the halftone correction device 100 of the present image forming apparatus 1, and thereafter the image forming apparatus 1 is shipped. In an image forming apparatus, however, the halftone characteristics change over time. If the initial correction tables remain unchanged, therefore, the characteristics of the outputs may deviate from the targets Ta1 to TaN. Therefore, the correction tables Tb1 to TbN are desired to be re-created as appropriate with the use of the targets Ta1 to TaN.

A halftone correction device in practical use generates halftone patterns in a predetermined number of tones, causes a scanner or the like to read a chart output to a sheet, measures the image densities of the halftone patterns in the tones, generates a halftone correction table using the measured image densities and the original image densities expected to be obtained in the patterns, and uses the thus generated halftone correction table in subsequent image drawing. Meanwhile, the present embodiment performs the halftone correction by causing the specialized sensors to read the patterns drawn not on a sheet but on the intermediate transfer belt 6 of the embodiment illustrated in FIG. 1, similarly to known halftone correction methods.

In FIG. 2, the number of halftone processes of generating and measuring halftone patterns may be plural, as long as the number is less than the total number of the halftone processes to be performed. In the present embodiment, however, description will be given of an example which uses the halftone patterns of one halftone process. That is, in the halftone correction device 100 of the present embodiment, which performs halftone correction processing for the N number of halftone processes D1 to DN, the halftone pattern generation unit 120 generates the halftone patterns of the halftone process D1, and the image density measurement unit 130 measures the image densities of the halftone patterns of the halftone process D1. On the basis of the measurement values of the image densities of the halftone patterns of the halftone process D1, the halftone correction device 100 estimates the halftone densities of the N−1 number of the other halftone processes D2 to DN, and generates the correction tables Tb2 to TbN for the halftone processes D2 to DN on the basis of the estimation results. Characteristics of the halftone correction device 100 according to the embodiment of the present invention lie in the generation of the correction tables Tb1 to TbN. Thus, the following description will be given of the operation of generating the correction tables Tb1 to TbN.

The halftone pattern generation unit 120 first draws the halftone patterns (hereinafter referred to as the tone patterns) of the halftone process D1 on the intermediate transfer belt 6 of FIG. 1. The halftone processing method employed in the halftone process D1 includes halftone processing used to generate a substantially high-definition image, such a photographic image. Further, the tone patterns generated in the halftone process D1 may be predetermined tone patterns used in a known halftone correction device, such as the tone patterns generated by the image forming apparatus of the foregoing JP-2009-211641-A. For reference, the dot-type area coverage modulation pattern and the line-type area coverage modulation pattern illustrated in FIG. 4 of JP-2009-211641-A are examples of the tone patterns.

Subsequently, the image density measurement unit 130 measures the image densities of the tone patterns of the halftone process D1 drawn on the intermediate transfer belt 6 of FIG. 1. As described above, the image density measurement unit 130 may employ a method using reflective optical sensors as a specific example of the image density measurement method. Further, sensors provided in an existing image forming apparatus to measure the image densities of solid density patterns drawn on the intermediate transfer belt 6 to correct the solid densities may be directly used as the reflective optical sensors for halftone correction processing. Alternatively, sensors functionally equivalent to the sensors for the solid density correction but specialized for the halftone correction processing of the present halftone correction device 100 may be provided.

Subsequently, each of the estimation blocks Eb2 to EbN of the tone density estimation unit 201 calculates the image density estimation values of the corresponding tone patterns using the measurement values of the image densities of the tone patterns of the halftone process D1 and the corresponding one of the relational expressions Re2 to ReN serving as estimation equations. The relational expressions Re2 to ReN serving as estimation equations are previously prepared as expressions representing the image density relationships of the tone patterns between the halftone process D1 and the respective halftone processes D2 to DN. With the use of the relational expressions Re2 to ReN, the calculation is performed to estimate the image densities.

Figure 3:
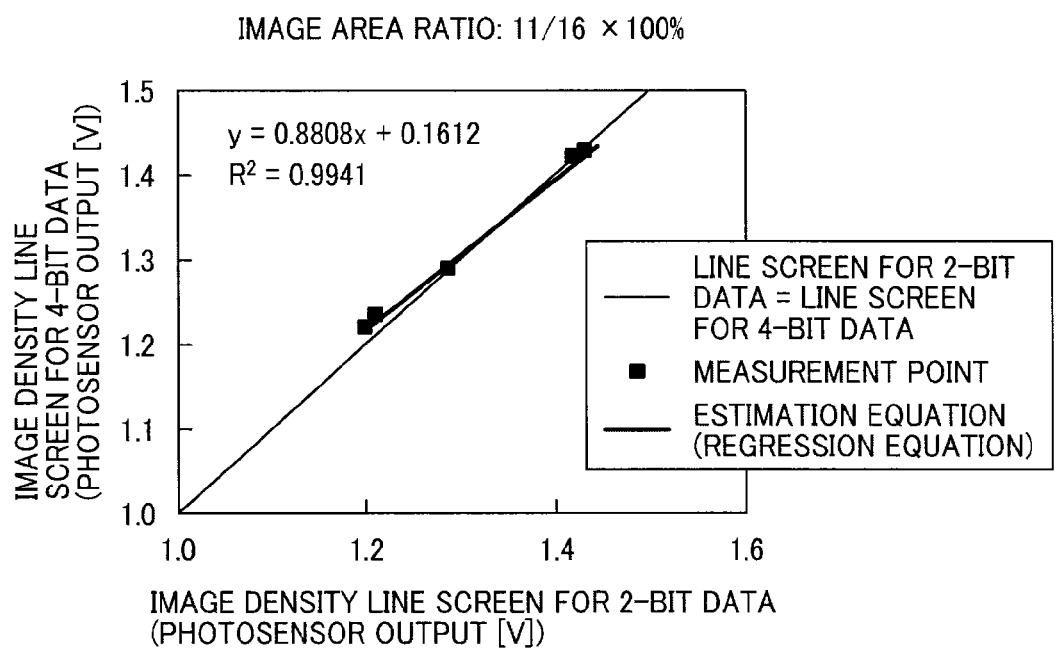
FIG. 3 is a graph illustrating the image density relationship between two types of line screen for bit data, specifically the correlation of image density between line screen for 2-bit data and line screen for 4-bit data at an image area ratio of approximately 11/16×100%.

Description will now be given of a method of generating the relational expressions Re2 to ReN representing the image density relationships of the tone patterns between the halftone process D1 and the respective halftone processes D2 to DN. The image densities in the halftone processes D1 to DN at a predetermined image area ratio are determined by the charge-to-mass ratio (Q/M) of toner, and the present inventor and others have found by experiment that the relationships therebetween are practically approximated by a linear expression of the charge-to-mass ratio. It is therefore assumed that the image density relationship between two halftone processes at a predetermined image area ratio is also approximated by a linear expression. Accordingly, if multiple image densities are previously measured at different charge-to-mass ratios of toner to obtain a regression estimation equation corresponding to the relational expression representing the relationship therebetween, an estimation equation corresponding to the relational expression representing the image density relationship between two halftone processes at a predetermined image area ratio is generated. FIG. 3 illustrates measurement data for deriving the estimation equation as the relational expression representing the image density relationship between two halftone processes and an equation y=0.8808x+0.1612 basically derived from the measurement data. In terms of the accuracy of the estimation equation as the relational expression, the coefficient of determination of the regression equation is represented by a relatively high value of approximately 0.9 in FIG. 3, i.e., the coefficient of determination is close to 1. Accordingly, the relationship is considered to be representable as a linear expression.

On the basis of the thus generated linear relational expression serving as the estimation equation, the correlation of the image densities of the tone patterns between two halftone processes is obtained. Further, the image density relationship obtained using the generated relational expression serving as the estimation expression may be specifically applied to obtain measurement and verification results of actual image densities, as illustrated in FIG. 3.

FIG. 3 illustrates the image density relationship between two halftone processes at a predetermined image area ratio of approximately 11/16×100% as the results of measurements using a printer included in an actual image forming apparatus. In FIG. 3, the image densities in two types of line screen for bit data are illustrated as a few measurement points of electrical output from a photosensor serving as a reflective optical sensor. In accordance with a known method, such as the least squares method, with measurement values at the measurement points, the regression estimation equation as a linear expression and the coefficient of determination corresponding to the square of measurement accuracy are also obtained. FIG. 3 shows that the coefficient of determination of the regression equation exceeds approximately 0.9, and thus that the linear expression indicates relatively high correlation, as described above.

According to the above-described method, the image densities of the tone patterns are obtained for all of the halftone processes D1 to DN performed by the present image forming apparatus 1. Using the image densities, the correction table generation unit 301 generates the correction tables Tb1 to TbN.

Then, in the correction table generation unit 301 for generating the halftone correction tables Tb1 to TbN corresponding to the halftone processes D1 to DN, the halftone correction tables Th1 to TbN for the halftone processes D1 to DN are generated on the basis of the actually measured or estimated halftone characteristics of the halftone processes D1 to DN.

With the above-described configuration, the image forming apparatus 1 of the embodiment of the present invention estimates, from the image density measurement values obtained by the generation and measurement of the tone patterns of the halftone process D1, the image densities of the tone patterns of the N−1 number of the other halftone processes D2 to DN, and generates the correction tables Tb2 to TbN for the halftone processes D2 to DN on the basis of the estimation results. Accordingly, an image forming apparatus is provided that provides reliably consistent, stable image output with a relatively small number of patch patterns.

The above-described embodiments are illustrative and do not limit the present invention. Thus, numerous additional modifications and variations are possible in light of the above teachings. For example, elements or features of different illustrative and embodiments herein may be combined with or substituted for each other within the scope of this disclosure and the appended claims. Further, features of components of the embodiments, such as number, position, and shape, are not limited to those of the disclosed embodiments and thus may be set as preferred. It is therefore to be understood that, within the scope of the appended claims, the disclosure of the present invention may be practiced otherwise than as specifically described herein.

What is claimed is:

1. A halftone correction device for use in an image forming apparatus that includes an intermediate transfer belt and performs a plurality of halftone processes, the halftone correction device comprising:
   a halftone correction unit configured to include a plurality of correction tables, each correction table corresponding to a respective one of the halftone processes, and perform halftone correction processing for each of the halftone processes using a corresponding one of the correction tables;
   a halftone pattern generation unit configured to generate, on the intermediate transfer belt, halftone patterns based on at least one of the halftone processes;
   an image density measurement unit configured to measure image densities of the halftone patterns generated on the intermediate transfer belt;
   a tone density estimation unit configured to estimate, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio; and
   a correction table generation unit configured to include correction target values, and generate the correction tables for the halftone processes using the correction target values and the image densities of the halftone patterns of the halftone processes.

2. The halftone correction device according to claim 1, wherein the relational expression includes a linear expression set for each image area ratio.

3. An image forming apparatus that performs a plurality of halftone processes, the image forming apparatus comprising:
   an image forming mechanism configured to include an intermediate transfer belt, and form an image on a recording medium via the intermediate transfer belt; and
   a halftone correction device comprising:
      a halftone correction unit configured to include a plurality of correction tables each corresponding to a respective one of the halftone processes, and perform halftone correction processing for each of the halftone processes using a corresponding one of the correction tables;
      a halftone pattern generation unit configured to generate, on the intermediate transfer belt, halftone patterns based on at least one of the halftone processes;
      an image density measurement unit configured to measure image densities of the halftone patterns generated on the intermediate transfer belt;
      a tone density estimation unit configured to estimate, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio; and a correction table generation unit configured to include correction target values, and generate the correction tables for the halftone processes using the correction target values and the image densities of the halftone patterns of the halftone processes.

4. The image forming apparatus according to claim 3, wherein the relational expression includes a linear expression set for each image area ratio.

5. A halftone correction method for use in an image forming apparatus that includes an intermediate transfer belt and performs a plurality of halftone processes, the halftone correction method comprising:

performing halftone correction processing for each of the halftone processes using a corresponding one of a plurality of correction tables;

generating, on the intermediate transfer belt, halftone patterns based on at least one of the halftone processes;

measuring image densities of the halftone patterns generated on the intermediate transfer belt;

estimating, from the image densities of the halftone patterns based on the at least one of the halftone processes, image densities of halftone patterns corresponding to the other ones of the halftone processes of the image forming apparatus, by applying a relational expression serving as an estimation equation to patches of the halftone patterns having an equal image area ratio; and generating the correction tables for the halftone processes using correction target values and the image densities of the halftone patterns of the halftone processes.

6. The halftone correction method according to claim 5, wherein the estimating applies, as the relational expression, a linear expression set for each image area ratio.

* * * * *